(12) United States Patent
Urmanov et al.

(10) Patent No.: US 8,489,343 B2
(45) Date of Patent: Jul. 16, 2013

(54) DETECTING CONSTRAINED MOTION OF A COMPONENT IN A COMPUTER SYSTEM

(75) Inventors: Aleksey M. Urmanov, San Diego, CA (US); Anton A. Bougaev, La Jolla, CA (US); David K. McElfresh, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 423 days.

(21) Appl. No.: 12/209,745

(22) Filed: Sep. 12, 2008

(65) Prior Publication Data

US 2010/0070210 A1 Mar. 18, 2010

(51) Int. Cl.
*G01F 17/00* (2006.01)
*G06F 11/30* (2006.01)

(52) U.S. Cl.
USPC ............. 702/56; 702/113; 702/182; 702/183; 702/184

(58) Field of Classification Search
USPC ................... 702/56, 141, 33–36, 39, 85, 108, 702/113, 115, 127, 182–186; 73/570–572, 73/577–583, 645
See application file for complete search history.

(56) References Cited

U.S. PATENT DOCUMENTS

| | | | |
|---|---|---|---|
| 7,711,452 B2 * | 5/2010 | Konstadinidis et al. | 700/280 |
| 2002/0123864 A1 * | 9/2002 | Eryurek et al. | 702/188 |
| 2003/0133388 A1 * | 7/2003 | Syring et al. | 369/75.1 |
| 2005/0096873 A1 * | 5/2005 | Klein | 702/184 |
| 2006/0212755 A1 * | 9/2006 | Urmanov et al. | 714/25 |

* cited by examiner

*Primary Examiner* — Phuong Huynh
(74) *Attorney, Agent, or Firm* — Park, Vaughan, Fleming & Dowler, LLP

(57) ABSTRACT

Some embodiments of the present invention provide a system that detects the presence of constrained motion in one or more components in a computer system. First, a vibrational spectrum of the computer system is monitored while the computer system operates. Then, the vibrational spectrum is analyzed using a pattern-recognition model to detect constrained motion in one or more components in the computer system, wherein the pattern-recognition model classifies the vibrational spectrum as indicating constrained motion or as not indicating constrained motion.

20 Claims, 3 Drawing Sheets

DETECTING CONSTRAINED MOTION OF A COMPONENT IN A COMPUTER SYSTEM

BACKGROUND

1. Field

The present invention generally relates to techniques for characterizing the performance of a computer system. More specifically, the present invention relates to a method and an apparatus that detects the presence of constrained motion, such as "rattling," in one or more components in a computer system.

2. Related Art

Many new higher density disk drives have smaller track sizes and tighter tolerances to increase their storage capacity. Unfortunately, smaller track sizes and tighter tolerances make such disk drives potentially more sensitive to vibrations during operation of the computer system. Typically, manufacturers will design computer systems so that any potential structural resonances fall outside the expected range of vibrations generated by components in the computer system. Additionally, manufacturers often use isolation and damping methods to control vibrations that are generated within problematic frequency ranges. However, these isolation and damping methods may lose their effectiveness as a computer system ages. Furthermore, various factors such as: misassembly of parts, failure to meet manufacturing tolerances, servicing imperfections, aging of materials, and environmental conditions can lead to the creation of new vibration modes or the worsening of existing vibration modes through constrained motion of components in the computer system. (This constrained motion is in some cases referred to as "rattling.") In particular, vibration modes generated by constrained motion of a component can generate a vibrational spectrum in the computer system that can result in degradation of the performance of disk drives. For example, the throughput of some disk drives may be more susceptible to degradation due to high frequency vibrations such as those that can be generated by some constrained motions of a component.

Hence, what is needed is a method and system that detects the presence of constrained motion in one or more components in a computer system without the above-described problems.

SUMMARY

Some embodiments of the present invention provide a system that detects the presence of constrained motion in one or more components in a computer system. First, a vibrational spectrum of the computer system is monitored while the computer system operates. Then, the vibrational spectrum is analyzed using a pattern-recognition model to detect constrained motion in one or more components in the computer system, wherein the pattern-recognition model classifies the vibrational spectrum as indicating constrained motion or as not indicating constrained motion.

In some embodiments, the constrained motion includes rattling, and the one or more components include at least one of: a disk drive, a disk carrier, a disk cage, a fan, a fan tray, and a fan mount.

In some embodiments, prior to monitoring the vibrational spectrum, the system trains the pattern-recognition model using a first training vibrational spectrum representing constrained motion of one or more components in a test computer system, and a second training vibrational spectrum representing an absence of constrained motion of one or more components in a test computer system.

In some embodiments, analyzing the vibrational spectrum includes extracting features from the vibrational spectrum and analyzing the extracted features using the pattern-recognition model.

In some embodiments, extracting the features from the vibrational spectrum includes generating a feature vector based on the vibrational spectrum.

In some embodiments, the pattern-recognition model includes one or more of: a quadratic classifier, a k-nearest neighbor classifier, and an R-cloud classifier.

In some embodiments, analyzing the vibrational spectrum includes transmitting information related to the vibrational spectrum over a network to a vibrational-analysis computer system, and analyzing the vibrational spectrum using the vibrational-analysis computer system.

Some embodiments further include generating a request for a service action based on the classification of the vibrational spectrum as indicating constrained motion or as not indicating constrained motion.

In some embodiments, monitoring the vibrational spectrum includes monitoring a set of vibrational spectra of the computer system while the computer system operates. Furthermore, analyzing the vibrational spectrum includes analyzing the vibrational spectra using a pattern-recognition model to detect constrained motion in one or more components in a computer system, wherein the pattern-recognition model classifies each vibrational spectrum in the vibrational spectra as indicating constrained motion or as not indicating constrained motion. Additionally, some embodiments further include generating a request for a service action based on the classification of a predetermined number of the vibrational spectra in the set of vibrational spectra as indicating constrained motion.

In some embodiments, monitoring a given vibrational spectrum of the computer system includes monitoring a given vibrational spectrum of the computer system using an accelerometer.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
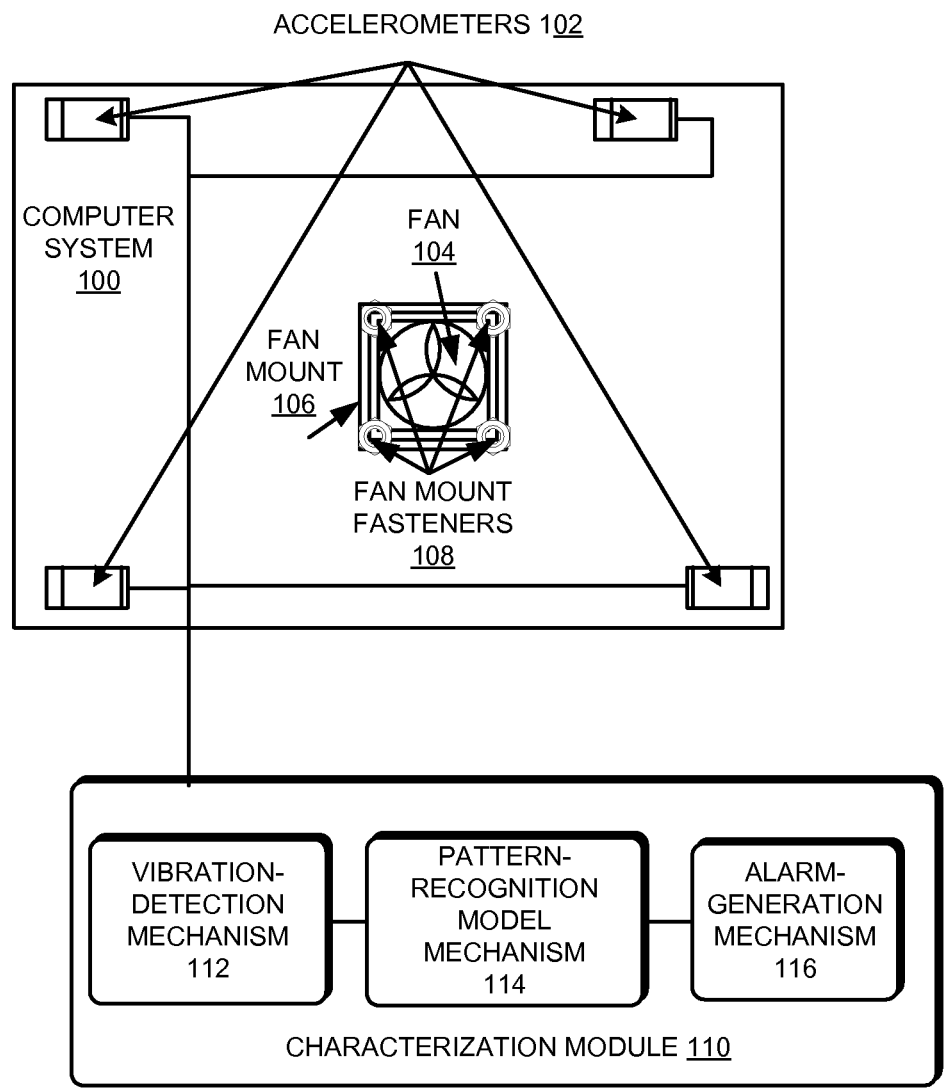
FIG. 1 illustrates a system that detects the presence of constrained motion in one or more components in a computer system in accordance with some embodiments of the present invention.

FIG. 1 illustrates a system that detects the presence of constrained motion in one or more components in a computer system in accordance with some embodiments of the present invention. Referring to FIG. 1, computer system 100 includes: accelerometers 102, and fan 104, which is coupled to fan mount 106 by fan mount fasteners 108. Furthermore, accelerometers 102 are coupled to characterization module 110 which includes vibration-detection mechanism 112, pattern-recognition model mechanism 114 and alarm-generation mechanism 116.

Computer system 100 can include but is not limited to a server, a server blade, a datacenter server, an enterprise computer, a field-replaceable unit that includes a processor, or any other computation system that includes one or more processors, and one or more cores in each processor.

Accelerometers 102 can be any type of acceleration-measuring device including but not limited to integrated electronics piezoelectric accelerometers, micro-electromechanical systems (MEMS) accelerometers, torsional accelerometers, mechanical or optical accelerometers, remote sensing devices, or any other device or system that can measure acceleration. In some embodiments, accelerometers 102 are 3-axis accelerometers that measure linear acceleration along three orthogonal axes. Note that accelerometers 102 can be placed in computer system 100 on the vertices of a known tetrahedron so that the spatial relationship between the locations of accelerometers 102 is known, and such that all four of accelerometers 102 are not in the same plane and no three of accelerometers 102 form a straight line. Additionally, signals from accelerometers 102 are communicated to characterization module 110 where vibration-detection mechanism 112 uses the signals to determine the spectra of vibrations in computer system 100 along one or more of three orthogonal linear axes and three orthogonal rotational axes. Note that in some embodiments in which vibrational spectra along fewer axes are desired, then fewer accelerometers can be used. For example, if vibrational spectra along one or more linear axes are desired then only one 3-axis accelerometer may be used in computer system 100. In some embodiments, one or more of accelerometers 102 are built into a computer system component or the case of computer system 100.

Fan 104 is coupled to fan mount 106 by fan mount fasteners 108. In some embodiments, one or more of fan mount fasteners 108 are loose, allowing fan 104 to vibrate with respect to fan mount 106 in motion constrained by one or more of fasteners 108 and/or fan mount 106. During the constrained motion, fan 104 vibrates, and impacts fasteners 108 and/or fan mount 106, generating vibrations in computer system 100. In some embodiments, the constrained motion includes a "rattling" motion of fan 104.

Vibration-detection mechanism 112 is coupled to accelerometers 102. During operation, vibration-detection mechanism 112 receives information from accelerometers 102 related to the measured accelerations, and determines the spectra of vibrations along one or more of three orthogonal linear axes and three rotational axes. Note that vibration-detection mechanism 112 can be implemented in any technology and any combination of hardware and software. In some embodiments, vibration-detection mechanism 112 includes a processor. In some embodiments, vibration-detection mechanism 112 operates on computer system 100. In some embodiments, vibration-detection mechanism 112 includes a wired or wireless communications mechanism and/or a connection through the Internet to transfer information including one or more vibrational spectra monitored by vibration-detection mechanism 112.

Pattern-recognition model mechanism 114 can be any device that can receive input from vibration-detection mechanism 112 and classify the vibrational spectrum as indicating constrained motion or as not indicating constrained motion. Note that pattern-recognition model mechanism 114 can implement any pattern-recognition model, including but not limited to nonlinear, non-parametric regression such as a multivariate state estimation technique (MSET), a quadratic classifier, a k-nearest neighbor classifier, or an R-cloud classifier. In some embodiments, pattern-recognition model mechanism 114 implements a classifier as set forth in a U.S. patent application entitled "Method and Apparatus for Classifying Data Using R-Functions," by Anton A. Bougaev, and Aleksey M Urmanov, application Ser. No. 11/387,253, filed 22 Mar. 2006, which is hereby fully incorporated by reference. Furthermore, pattern-recognition model mechanism 114 can be implemented in any combination of hardware and software. In some embodiments, pattern-recognition model mechanism 114 operates on computer system 100. In other embodiments, pattern-recognition model mechanism 114 operates on one or more service processors. In still other embodiments, pattern-recognition model mechanism 114 is located inside computer system 100. In yet other embodiments, pattern-recognition model mechanism 114 operates on a separate computer system.

Note that the term MSET as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington DC, Nov. 13-17, 2000. This paper outlines several different pattern-recognition approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

Alarm-generation mechanism 116 can be any device that can receive input from pattern-recognition model mechanism 114 and can generate an alarm in accordance with embodiments of the present invention. In some embodiments, alarm-generation mechanism 116 generates an alarm based an analysis of the output of pattern-recognition model mechanism 114 using one or more of the following: a sequential hypothesis test such as a sequential probability ratio test (SPRT), or any other test to characterize computer system 100 based on the output from pattern-recognition model mechanism 114. Note that alarm-generation mechanism 116 can be implemented in any combination of hardware and software. In some embodiments, alarm-generation mechanism 116 operates on computer system 100. In other embodiments, alarm-generation mechanism 116 operates on one or more service processors. In still other embodiments, alarm-generation mechanism 116 is located inside computer system 100. In yet other embodiments, alarm-generation mechanism 116 operates on a separate computer system.

In some embodiments, one or more of vibration-detection mechanism 112, pattern-recognition model mechanism 114, and alarm-generation mechanism 116 operate on a remote computer system, which can include a server. These mechanisms can communicate through network connections, including the Internet that can include one or more wired and/or wireless links. For example, in some embodiments, signals received from accelerometers 102 are transmitted to vibration-detection mechanism 112 which is running on a processor in computer system 100. Then, vibration-detection mechanism 112 communicates the monitored vibrational spectra to pattern-recognition model mechanism 114 operating on a server at a remote location through a network connection to computer system 100 that may include both wired and wireless links and a connection through the Internet. Pattern-recognition model mechanism 114 then classifies the received spectra as indicating constrained motion or not indicating constrained motion. Then, pattern-recognition model mechanism 114 communicates the results of the classification to alarm-generation mechanism 116 operating either on the server at the remote location or on computer system 100, which generates an alarm based on the results of the classification.

Some embodiments of the present invention operate as follows. During operation of computer system 100, fan blades in fan 104 rotate. Since one or more of fan mount fasteners 108 are loose, as the fan blades in fan 104 rotate, fan 104 vibrates and undergoes constrained motion with respect to one or more of fan mount fasteners 108 and/or fan mount 106. The constrained motion of fan 104 causes vibrations to be transmitted to computer system 100, and these vibrations are monitored by accelerometers 102. Signals from accelerometers 102 are transmitted to vibration-detection mechanism 112 which determines the vibrational spectrum of the vibrations measured by accelerometers 102. Then, the monitored vibrations detected by vibration-detection mechanism 112 are transmitted to pattern-recognition model mechanism 114. Next, pattern-recognition model mechanism 114 implements a pattern-recognition model to determine if the vibrational spectrum includes vibrations due to constrained motion. Note that the pattern-recognition model implemented by pattern-recognition model mechanism 114 is trained during a training process which will be described below. Then, pattern-recognition model mechanism 114 classifies the one or more vibrational spectra received from vibration-detection mechanism 112 as indicating constrained motion or as not indicating constrained motion and the results are communicated to alarm-generation mechanism 116.

Alarm-generation mechanism 116 generates an alarm when a signal is received from pattern-recognition model mechanism 114, wherein the alarm indicates that constrained motion has been detected in computer system 100. In some embodiments, the alarm generated by alarm-generation mechanism 116 includes but is not limited to one or more of the following: scheduling a service action for computer system 100, notifying a computer system operator of the detection of constrained motion in computer system 100, altering or suggesting the altering of one or more functions of computer system 100 to ameliorate potential problems due to the detected constrained motion, or any other notification or action desired to be taken in response to the detection of constrained motion in computer system 100. For example, in some embodiments, when a signal is received from pattern-recognition model mechanism 114 indicating constrained motion has been detected in computer system 100, alarm-generation mechanism 116 sends a signal to computer system 100 to alter the speed of fan 104 to reduce or eliminate effects of the constrained motion and/or the vibrations due to the constrained motion in computer system 100. In some embodiments, alarm-generation mechanism 116 continues to send signals to computer system 100 to alter the speed of fan 104 until pattern-recognition model mechanism 114 no longer classifies vibrational spectra from computer system 100 as indicating constrained motion, the speed of fan 104 has been altered a predetermined number of times, or the request by alarm-generation mechanism 116 to alter the speed of fan 104 is rejected or not acknowledged by computer system 100.

In some embodiments, when pattern-recognition model mechanism 114 classifies the one or more vibrational spectra received from vibration-detection mechanism 112 as indicating constrained motion, pattern-recognition model mechanism 114 additionally determines which component in the computer system is undergoing the constrained motion. For example, in some embodiments, computer system 100 includes a disk drive that may undergo constrained motion when fasteners coupling the disk drive to a disk drive mount become loose. Then, when pattern-recognition model mechanism 114 classifies the one or more vibrational spectra received from vibration-detection mechanism 112 as indicating constrained motion, pattern-recognition model mechanism 114 additionally determines whether the component undergoing constrained motion is fan 104, the disk drive, or both.

In some embodiments, there are components in computer system 100 that can undergo constrained motion that can be detected by pattern-recognition model mechanism 114 other than fans and disk drives, including but not limited to one or more of the following: a fastener; a bracket; a mount, including a fan mount; a disk carrier; a disk cage; a fan tray; a board; or any other component in a computer system whose vibratory motion is constrained by impacting one or more other components.

In some embodiments, vibration-detection mechanism 112 transmits a monitored vibrational spectrum of computer system 100 to pattern-recognition model mechanism 114 at predetermined intervals or according to a predetermined schedule. Then, pattern-recognition model mechanism 114 classifies the received vibrational spectrum as indicting constrained motion or as not indicating constrained motion. In some of these embodiments, alarm-generation mechanism 116 does not generate an alarm until a predetermined number or pattern of vibrational spectra received by pattern-recognition model mechanism 114 have been classified as indicating constrained motion.

In some embodiments, the monitored vibrational spectrum received by pattern-recognition model mechanism 114 is transformed from the time domain to the frequency domain prior to being input into the pattern recognition model. In some embodiments, the vibrational spectrum is transformed to the frequency domain using a fast Fourier transform (FFT) implemented by pattern-recognition model mechanism 114. In other embodiments, other transform functions can be used, including, but not limited to, a Laplace transform, a discrete Fourier transform, a Z-transform, and any other transform technique now known or later developed.

In some embodiments, the vibrational spectra received by pattern-recognition model mechanism 114 are processed by a feature-extraction mechanism included in pattern-recognition model mechanism 114 prior to being processed by the pattern-recognition model implemented by pattern-recognition model mechanism 114. In some embodiments, the feature-extraction mechanism extracts a predetermined number of the of the largest amplitude vibration frequencies from a vibrational spectrum, and these amplitudes and the corresponding frequencies comprise a feature vector which is then used by pattern-recognition model mechanism 114 to classify the vibrational spectrum as either containing constrained motion or not containing constrained motion. In some embodiments, the feature vector is further processed prior to being analyzed by pattern-recognition model mechanism 114 for the presence of constrained motion. In some embodiments, the feature vector is further transformed to obtain another feature vector which can include but is not limited to increasing or decreasing the dimensionality of the feature vector.

In some embodiments, characterization module 110 includes a performance-parameter monitor that monitors performance parameters of computer system 100 while vibration-detection mechanism 112 is monitoring signals from accelerometers 102. Performance parameters of computer system 100 can include but are not limited to one or more of the following: the speed of one or more fans in computer system 100; the read rate, write rate, and input/output attempt rate for one or more disk drives in computer system 100; and a time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

Note that the performance-parameter monitor can be implemented in any combination of hardware and software. In some embodiments, the performance-parameter monitor operates on computer system 100. In other embodiments, the performance-parameter monitor operates on one or more service processors. In still other embodiments, the performance-parameter monitor is located inside of computer system 100. In yet other embodiments, the performance-parameter monitor operates on a separate computer system. In some embodiments, the performance-parameter monitor includes a method and/or apparatus for monitoring and recording computer system performance parameters as set forth in U.S. Pat. No. 7,020,802.

In some embodiments, pattern-recognition model mechanism 114 receives input from the performance-parameter monitor in addition to vibration-detection mechanism 112. Pattern-recognition model mechanism 114 then classifies the one or more vibrational spectra received from vibration-detection mechanism 112 as indicating constrained motion or as not indicating constrained motion. When, pattern-recognition model mechanism 114 classifies the one or more vibrational spectra received from vibration-detection mechanism 112 as indicating constrained motion, pattern-recognition model mechanism 114 additionally uses monitored performance parameters to determine which component in the computer system is undergoing the constrained motion. For example, in the embodiments depicted in FIG. 1, if additional fans are present in computer system 100, monitored performance parameters of computer system 100 that include the speed of each fan in the computer system are used by pattern-recognition model mechanism 114 to identify the source of the constrained motion. In some embodiments, pattern-recognition model mechanism 114 identifies the fan causing the constrained motion based on the relationship between the vibrational spectrum identified as containing constrained motion and the speed of each fan at the time the vibrational spectrum was monitored. In some embodiments, the fan causing the vibrations due to constrained motion is identified based on the presence of harmonics of the fan frequency in the vibrational spectrum classified by pattern-recognition model mechanism 114 as indicating constrained motion.

We now turn to the training of the pattern-recognition model. In some embodiments, the pattern-recognition model is trained as follows. A training data set is generated from one or more vibrational spectra measured from one or more training computer systems using the methods for monitoring vibrational spectra discussed above. The training data set includes a subset of data that contains one or more vibrational spectra resulting from constrained motion of a component in a training computer system and a subset of data that contains one or more vibrational spectra resulting from monitoring a computer system with no constrained motion. In some embodiments, the subset of the training data that includes constrained motion of a component includes data generated for one or more training computer systems, each containing one or more different components undergoing constrained motion. Note that in some embodiments, the one or more training computer systems are the same or similar computer systems to computer system 100.

In some embodiments, the training data is generated using accelerometers and a vibration-detection mechanism in the one or more training computer systems similar to those depicted in FIG. 1. The training computer systems are then: 1) screened for training computer systems that contain and do not contain components that undergo constrained motion, and/or 2) modified so that one or more of training computer systems contains at least one component that undergoes constrained motion and one or more of training computer systems do not contain a component that undergoes constrained motion. In some embodiments, the one or more training computer systems modified to contain at least one component that undergoes constrained motion are modified by loosening a predetermined connection or fastener coupled to a component so that the component undergoes a predetermined constrained motion.

The two subsets of data, one containing data from training computer systems containing components undergoing constrained motion and one containing data from training computer systems with no constrained motion, are then used to train the pattern-recognition model so that the model classifies received spectra into two classes: one indicating constrained motion detected and the other indicating no constrained motion detected. In some embodiments, when the training data includes predetermined constrained motion of one or more components as discussed above, the pattern-recognition model is trained to further classify received spectra based on the component and/or the predetermined constrained motion generating the received spectra. In some embodiments, the training data is preprocessed before being used to train the model. For example, in some embodiments a feature vector, as discussed above, is generated for each vibrational spectrum in the training data, and the feature vector is used to train the pattern-recognition model. Additionally, in some embodiments, the pattern-recognition model is trained to classify received spectra based on the high frequency content of the received spectra. In some embodiments, the two classes of the received spectra differ more at higher frequencies due to the higher frequency vibrations generated by constrained motion. In some of these embodiments, the pattern-recognition model is trained using these higher frequency vibrations to classify the spectra into the two classes.

Figure 2:
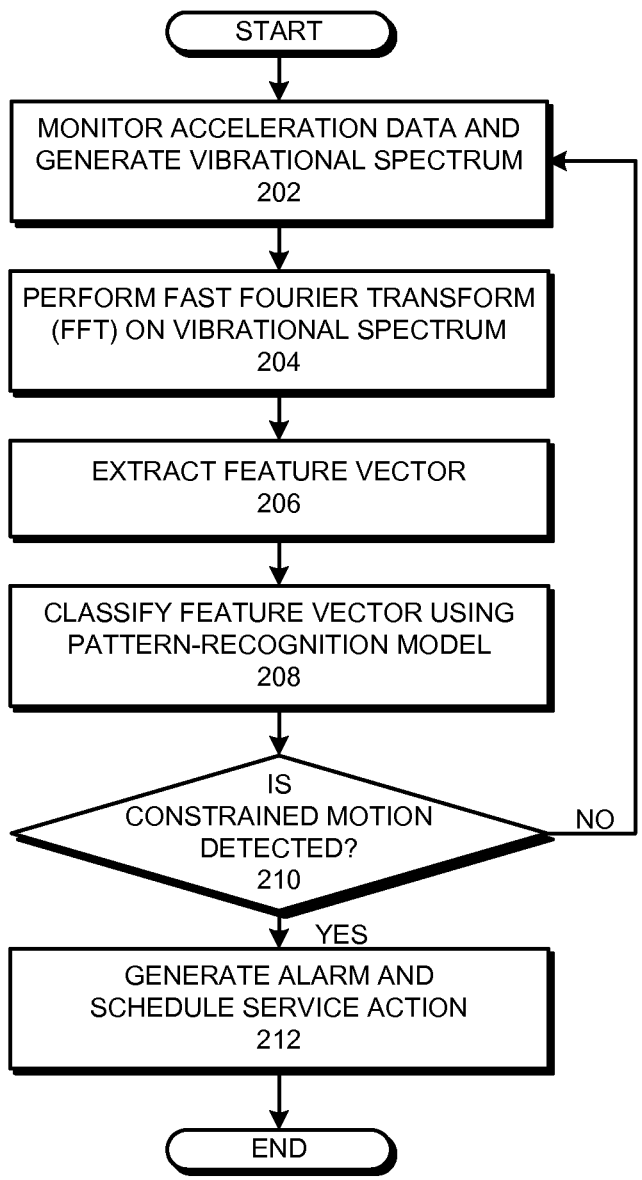
FIG. 2 presents a flowchart illustrating a process for detecting the presence of constrained motion in one or more components in a computer system in accordance with some embodiments of the present invention.

FIG. 2 presents a flowchart illustrating a process for detecting the presence of constrained motion in one or more components in a computer system in accordance with some embodiments of the present invention. First, acceleration data is monitored from the computer system and a vibrational spectrum is generated from the acceleration data (step 202). Next, the vibrational spectrum is transformed into a frequency domain representation using a fast Fourier transform (FFT) (step 204). Then, a feature vector is extracted from the frequency representation of the vibrational spectrum (step 206). Then, the feature vector is classified using a pattern-recognition model as either indicating constrained motion or as not indicating constrained motion (step 208). Then, if the pattern-recognition model classifies the vibrational spectrum as not indicating constrained motion (step 210), the process returns to step 202. However, if the pattern-recognition model classifies the vibrational spectrum as indicating constrained motion (step 210) then the process continues on to step 212. Then, an alarm is generated and a service action is scheduled for the computer system to address the source of the constrained motion of the component in the computer system.

Figure 3:
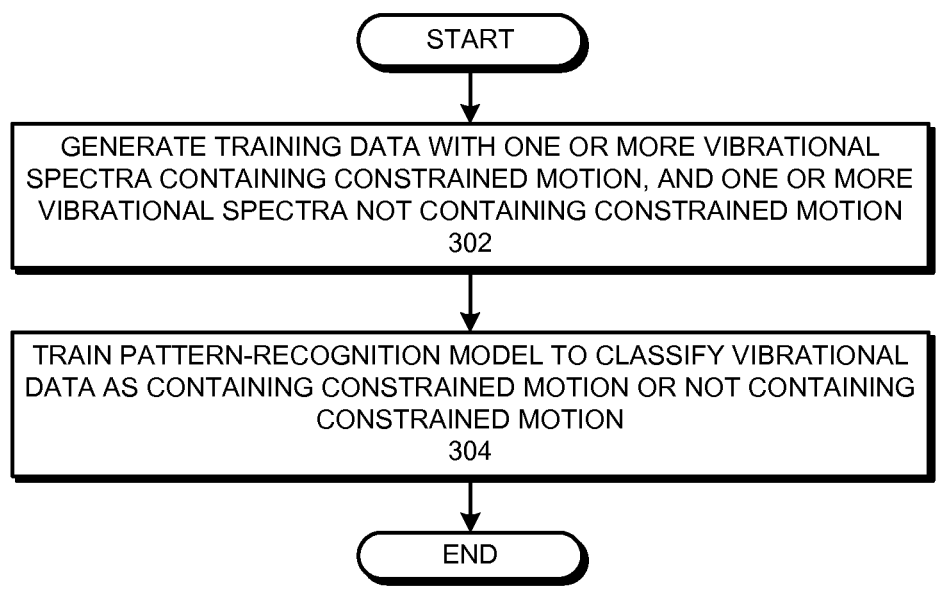
FIG. 3 presents a flowchart illustrating a process for training a pattern-recognition model to classify vibrational spectra as containing or not containing constrained motion of a component in a computer system in accordance with embodiments of the present invention.

FIG. 3 presents a flowchart illustrating a process for training a pattern-recognition model to classify vibrational spectra as containing or not containing constrained motion of a component in a computer system in accordance with embodiments of the present invention. First, training data is generated that contains two subsets of data: one subset containing one or more vibrational spectra due to constrained motion of a component in a training computer system, and the other subset containing one or more vibrational spectra from a training computer system in which there is not a component generating a vibrational spectrum due to constrained motion (step 302). Next, a pattern-recognition model is trained using the training data to classify vibrational spectra as either indicating constrained motion or as not indicating constrained motion (step 304).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting the presence of constrained motion in one or more components in a computer system, the method comprising:
monitoring a vibrational spectrum of the computer system while the computer system operates;
analyzing the vibrational spectrum using a pattern-recognition model to detect constrained motion in one or more components in the computer system, wherein constrained motion occurs when at least one mounting fastener for a component is loose, so that the component impacts one or more fasteners, mounts, or other components in the computer system when vibrating, and wherein the pattern-recognition model classifies the vibrational spectrum as indicating constrained motion or as not indicating constrained motion;
monitoring one or more performance parameters in the computer system;
upon classifying the vibrational spectrum as indicating constrained motion, using the vibrational spectrum and the monitored performance parameters to identify which of the components in the computer system is undergoing the constrained motion; and
sending a signal to alter a speed of a fan for the computer system until the constrained motion for at least one of the identified components is reduced or eliminated.

2. The method of claim 1, wherein:
the constrained motion includes rattling; and
the one or more components include at least one of:
a disk drive;
a disk carrier;
a disk cage;
a fan;
a fan tray; and
a fan mount.

3. The method of claim 1, wherein prior to monitoring the vibrational spectrum, the method further comprises:
training the pattern-recognition model using a first training vibrational spectrum representing constrained motion of one or more components in a test computer system, and a second training vibrational spectrum representing an absence of constrained motion of one or more components in a test computer system.

4. The method of claim 1, wherein analyzing the vibrational spectrum includes extracting features from the vibrational spectrum and analyzing the extracted features using the pattern-recognition model.

5. The method of claim 4, wherein extracting the features from the vibrational spectrum includes generating a feature vector based on the vibrational spectrum.

6. The method of claim 1, wherein the pattern-recognition model includes one or more of:
a quadratic classifier;
a k-nearest neighbor classifier; and
an R-cloud classifier.

7. The method of claim 1, wherein analyzing the vibrational spectrum includes:
transmitting information related to the vibrational spectrum over a network to a vibrational-analysis computer system; and
analyzing the vibrational spectrum using the vibrational-analysis computer system.

8. The method of claim 1, further including generating a request for a service action based on the classification of the vibrational spectrum as indicating constrained motion or as not indicating constrained motion.

9. The method of claim 1,
wherein monitoring the vibrational spectrum includes monitoring a set of vibrational spectra of the computer system while the computer system operates;
wherein analyzing the vibrational spectrum includes analyzing the vibrational spectra using a pattern-recognition model to detect constrained motion in one or more components in a computer system, wherein the pattern-recognition model classifies each vibrational spectrum in the vibrational spectra as indicating constrained motion or as not indicating constrained motion; and
wherein the method further comprises generating a request for a service action based on the classification of a predetermined number of the vibrational spectra in the set of vibrational spectra as indicating constrained motion.

10. The method of claim 1, wherein using the vibrational spectrum and the monitored performance parameters to identify the component undergoing the constrained motion comprises identifying the component based on a relationship between a vibrational spectrum for the component that the pattern-recognition model classified as indicating constrained motion and speeds for each component in a set of components in the computer system at the time the vibrational spectrum was monitored, wherein the relationship comprises a presence of harmonics of a frequency for the component in the vibrational spectrum, and wherein the set of components comprises at least one of a fan and a disk drive.

11. The method of claim 1, wherein the at least one of the identified components do not include the fan.

12. The method of claim 11, further comprising: continuing to send the signal until the vibrational spectrum no longer indicates constrained motion for the at least one of the identified components.

13. A non-transitory computer-readable storage medium storing instructions that when executed by a computer cause the computer to perform a method for detecting the presence of constrained motion in one or more components in a computer system, the method comprising:
  monitoring a vibrational spectrum of the computer system while the computer system operates;
  analyzing the vibrational spectrum using a pattern-recognition model to detect constrained motion in one or more components in the computer system, wherein constrained motion occurs when at least one mounting fastener for a component is loose, so that the component impacts one or more fasteners, mounts, or other components in the computer system when vibrating, and wherein the pattern-recognition model classifies the vibrational spectrum as indicating constrained motion or as not indicating constrained motion;
  monitoring one or more performance parameters in the computer system;
  upon classifying the vibrational spectrum as indicating constrained motion, using the vibrational spectrum and the monitored performance parameters to identify which of the components in the computer system is undergoing the constrained motion; and
  sending a signal to alter a speed of a fan for the computer system until the constrained motion for at least one of the identified components is reduced or eliminated.

14. The computer-readable storage medium of claim 13, wherein:
  the constrained motion includes rattling; and
  the one or more components include at least one of:
    a disk drive;
    a disk carrier;
    a disk cage;
    a fan;
    a fan tray; and
    a fan mount.

15. The computer-readable storage medium of claim 13, wherein prior to monitoring the vibrational spectrum, the method further comprises:
  training the pattern-recognition model using a first training vibrational spectrum representing constrained motion of one or more components in a test computer system, and a second training vibrational spectrum representing an absence of constrained motion of one or more components in a test computer system.

16. The computer-readable storage medium of claim 13, wherein analyzing the vibrational spectrum includes extracting features from the vibrational spectrum and analyzing the extracted features using the pattern-recognition model.

17. The computer-readable storage medium of claim 16, wherein extracting the features from the vibrational spectrum includes generating a feature vector based on the vibrational spectrum.

18. The computer-readable storage medium of claim 13, wherein the pattern-recognition model includes one or more of:
  a quadratic classifier;
  a k-nearest neighbor classifier; and
  an R-cloud classifier.

19. The computer-readable storage medium of claim 13,
  wherein monitoring the vibrational spectrum includes monitoring a set of vibrational spectra of the computer system while the computer system operates;
  wherein analyzing the vibrational spectrum includes analyzing the vibrational spectra using a pattern-recognition model to detect constrained motion in one or more components in a computer system, wherein the pattern-recognition model classifies each vibrational spectrum in the vibrational spectra as indicating constrained motion or as not indicating constrained motion; and
  wherein the method further comprises generating a request for a service action based on the classification of a predetermined number of the vibrational spectra in the set of vibrational spectra as indicating constrained motion.

20. An apparatus that detects the presence of constrained motion in one or more components in a computer system, the apparatus comprising:
  a monitoring mechanism configured to monitor a vibrational spectrum of the computer system while the computer system operates and one or more performance parameters in the computer system;
  an analyzing mechanism configured to analyze the vibrational spectrum using a pattern-recognition model to detect constrained motion in one or more components in the computer system, wherein constrained motion occurs when at least one mounting fastener for a component is loose, so that the component impacts one or more fasteners, mounts, or other components in the computer system when vibrating, and wherein the pattern-recognition model classifies the vibrational spectrum as indicating constrained motion or as not indicating constrained motion;
  a mechanism configured to, upon the pattern-recognition model classifying the vibrational spectrum as indicating constrained motion, use the vibrational spectrum and the monitored performance parameters to identify which of the components in the computer system is undergoing the constrained motion; and
  a mechanism configured to send a signal to alter a speed of a fan for the computer system until the pattern-recognition model indicates that the constrained motion for at least one of the identified components is reduced or eliminated.

* * * * *